US008745737B2

(12) United States Patent
Thomas et al.

(10) Patent No.: US 8,745,737 B2
(45) Date of Patent: Jun. 3, 2014

(54) SYSTEMS AND METHODS FOR DETECTING SIMILARITIES IN NETWORK TRAFFIC

(75) Inventors: Matthew Thomas, Atlanta, GA (US); Nipun Jawalkar, Fribourg (CH)

(73) Assignee: Verisign, Inc, Reston, VA (US)

( * ) Notice: Subject to any disclaimer, the term of this patent is extended or adjusted under 35 U.S.C. 154(b) by 71 days.

(21) Appl. No.: 13/340,523

(22) Filed: Dec. 29, 2011

(65) Prior Publication Data

US 2013/0174253 A1 Jul. 4, 2013

(51) Int. Cl.
*G06F 11/00* (2006.01)
*G06F 12/14* (2006.01)
*G06F 12/16* (2006.01)
*G08B 23/00* (2006.01)

(52) U.S. Cl.
USPC .......................................................... 726/22

(58) Field of Classification Search
USPC .......................................................... 726/22
See application file for complete search history.

(56) References Cited

U.S. PATENT DOCUMENTS

| | | | |
|---|---|---|---|
| 6,757,675 B2 * | 6/2004 | Aiken et al. ........................... | 1/1 |
| 7,620,733 B1 | 11/2009 | Tzakikario et al. | |
| 8,271,500 B2 * | 9/2012 | Chellapilla et al. ............ | 707/747 |
| 2006/0212925 A1 * | 9/2006 | Shull et al. .......................... | 726/1 |
| 2008/0140700 A1 * | 6/2008 | Carpentier et al. ............ | 707/102 |
| 2009/0003352 A1 * | 1/2009 | Gutknecht et al. ....... | 370/395.32 |
| 2009/0222924 A1 | 9/2009 | Droz et al. | |
| 2010/0037314 A1 * | 2/2010 | Perdisci et al. .................. | 726/22 |
| 2010/0088549 A1 | 4/2010 | Duffield et al. | |
| 2010/0115618 A1 | 5/2010 | Lee et al. | |
| 2011/0167495 A1 | 7/2011 | Antonakakis et al. | |

FOREIGN PATENT DOCUMENTS

EP 1906620 A1 4/2008

OTHER PUBLICATIONS

Hyunsang Choi et al., BotGAD: Detecting Botnets by Capturing Group Activities in Network Traffic, COMSWARE '09, Proceedings of the Fourth International ICST Conference on Communication System Software and Middleware, pp. 1-27.
Hyunsang Choi et al., Identifying Botnets by Capturing Group Activities in DNS Traffic, Computer Networks, Accepted Jul. 22, 2011, Available online Jul. 30, 2011, pp. 1-14.
Extended European Search Report, dated Apr. 24, 2013, European Application No. EP 12197272.3, filed Dec. 14, 2012, pp. 1-8, published by the European Patent Office.
Hyunsang, Choi et al., "Identifying botnets by capturing group activities in DNS traffic", Computer Networks, Elsevier Science Publishers B.V., Amsterdam, NL, vol. 56, No. 1, Jul. 22, 2011, pp. 20-33.
Perdisci, R. et al., "Detecting Malicious Flux Service Networks through Passive Analysis of Recursive DNS Traces", Computer Security Applications Conference, 2009, ACSAC '09, Annual, IEEE, Piscataway, NJ, Dec. 7, 2009, pp. 311-320.

* cited by examiner

*Primary Examiner* — Dant Shaifer Harriman
(74) *Attorney, Agent, or Firm* — MH2 Technology Law Group LLP

(57) ABSTRACT

A system, computer-readable medium, and method for identifying similarities in network traffic are provided. Hash values are calculated from Internet Protocol (IP) addresses in a group of IP addresses that request a domain name, a hash signature is generated from the hash values and paired with the domain name, and the domain name is then clustered with another domain name having a paired hash of the same value. The clustered domain names are then extracted and used in a similarity calculation.

20 Claims, 6 Drawing Sheets

|  | XYZ.com | ABC.com | MNO.com | SOY.com |
|---|---|---|---|---|
| XYZ.com | 1 | 0.9 | 0.7 | 0.8 |
| ABC.com | 0.9 | 1 | 0.5 | 0.4 |
| MNO.com | 0.7 | 0.5 | 1 | 0.3 |
| SOY.com | 0.8 | 0.4 | 0.3 | 1 |

SYSTEMS AND METHODS FOR DETECTING SIMILARITIES IN NETWORK TRAFFIC

TECHNICAL FIELD

The present disclosure relates to detecting similar characteristics of network traffic, and more particularly, to systems and methods for detecting network traffic exhibiting similarities associated with specific identifiable behaviors.

BACKGROUND OF THE DISCLOSURE

Traffic on networks, such as the Internet, has grown significantly in recent years. Monitoring trends and similarities in the characteristics of network traffic can provide useful information for a variety of different entities, such as providers of network services and products. One specific area where this information is of use is in the field of malware detection.

Malware, short for malicious software, is software that is designed for hostile or intrusive purposes. For example, malware may be designed with the intent of gathering information, denying or disrupting operations, accessing resources without authorization, and other abusive purposes. Types of malware include, for example, computer viruses, worms, trojan horses, spyware, adware, and botnets. Malware developers typically distribute their software via the Internet, often clandestinely. As Internet use continues to grow around the world, malware developers have more incentives than ever for releasing this software. In fact, studies indicate that the release rate of malicious software today could even be exceeding that of legitimate software.

In order to protect computers from malware, there has been a growing demand for anti-malware software, including secure web gateways (SWGs). A SWG is software designed and optimized for controlling whether to permit transmission of incoming or outgoing content on a network. SWGs are typically installed locally in a corporate office or other entity that expects incoming and outgoing network traffic. SWGs assign scores to traffic destination sources and/or origination points based on the suspiciousness of a destination source and/or origination point. These scores are then used to determine whether or not to allow transmission of packets transmitted to a particular destination source, or from a particular origination point.

Botnets are one example of malware that has become a major security threat in recent years. A botnet is a network of "innocent" host computers that have been infected with malicious software in such a way that a remote attacker is able to control the host computers. The malicious software used to infect the host computers is referred to as a "bot," which is short for "robot." Botnets operate under a command and control (C&C) architecture, where a remote attacker is able to control the infected computers, often referred to as "zombie" computers. An attacker may control the infected computers to carry out online anti-social or criminal activities, such as e-mail spam, click fraud, distributed denial-of-service attacks (DDoS), or identity theft.

FIG. 1 illustrates an exemplary C&C architecture of a botnet 100. The C&C master 101, often referred to as a "botmaster" or "bot herder," distributes malicious bot software, typically over the Internet 102. This bot software stores information or has an algorithm identifying a future time and domain names to contact at the indicated future time. The bot software infects a number of host computers 103 causing them to become compromised. Users of host computers 103 typically do not know that the bot software is running on their computers. C&C master 101 also registers temporary domain names to be used as C&C servers 104. Then, at the indicated future time, the bots instruct host computers 103 to contact C&C servers 104 to get instructions. The instructions are sent over a C&C channel. The ability to send instructions to host computers 103 provides C&C master 101 with control over a large number of host computers. This enables C&C master 101 to generate huge volumes of network traffic, which can be used for e-mailing spam messages, shutting down or slowing web sites through DDoS attacks, or other purposes.

Botnets exploit the domain name system (DNS) to rally infected host computers. DNS is the Internet's hierarchical lookup service for mapping character-based domain names meaningful to humans into numerical Internet Protocol (IP) addresses. Domains exist at various different levels within the DNS hierarchy. For example, a top-level domain (TLD), such as .com or .net, is a domain at the highest level in the DNS hierarchy. A second-level domain (SLD) is a subdomain of a TLD that is directly below the TLD in the DNS hierarchy. For example, "com" is the TLD and "example" is the SLD for the domain name "www.example.com."

A name server is a server that translates domain names into IP addresses. Each domain has at least one authoritative DNS name server that publishes information about the domain. Domain name resolvers determine appropriate domain name servers for a domain name by performing a sequence of queries beginning with the right-most domain, which is the TLD. In domain name resolution, a query is submitted to one of the root servers to find the authoritative server for the TLD. A query is then submitted to the TLD server for the address of an authoritative server for the second-level domain. This process is continued through the levels of the DNS hierarchy until the IP address sought is returned. For example, in resolving a query for "www.example.com," a query would be submitted to one of the root servers to find the authoritative server for "com." A query would then be sent to the server for "com" requesting the address of the authoritative server for "example.com." A query would then be sent to the server for "example.com," and this server would respond with the IP address corresponding to "www.example.com."

Many C&C masters dynamically change the IP addresses associated with the domain names of the C&C servers to avoid detection. Infecting the host computers with bots containing domain names of the C&C servers allows the host computers to contact the appropriate C&C servers through DNS resolution, even if the IP addresses of the C&C servers have changed. Thus, bots may locate C&C servers according to their domain names. Some remote attackers also change the domain names of the C&C servers to even further avoid detection. Nevertheless, bots in a botnet usually act as a group, sending periodic DNS queries to join C&C channels. Because bots within the same botnet are likely to generate similar DNS traffic, analyzing DNS traffic data to detect this behavior is an effective way of detecting botnets.

When a network device queries for a domain name, DNS resolution determines whether or not the domain name exists. These queries leave resource request information indicating the network device requesting the domain name. Some botnets frequently change the domain names they use for resolution, and these domain names may even be randomly assigned. When this is the case, each bot is programmed to query for a multitude of domain names in hopes that the C&C master has registered at least one or more of them via DNS. Because the C&C master will likely only register a few of these domain names at most, the rest of the domain name requests will be for domains that don't exist. These requests may return nonexistent domain (NXDomain) replies and leave NXDomain records in the DNS. Alternatively, if a requested domain name does exist, the request may return an existent domain (YXDomain) reply and leave a YXDomain record in the DNS.

Approaches have been taken to utilize DNS record data to detect suspicious DNS behavior. However, these approaches have been conducted by computing a similarity matrix using small sets of data. Analyzing a larger set of data would provide for a more accurate and comprehensive means of detecting suspicious DNS behavior. Nevertheless, computing similarity of DNS behavior with a large amount of data, such as the NXDomain data from a TLD, requires a large amount of processing power and can take a long time.

As botnet domain names and IP addresses can change quickly over time, it is important to compute this similarity as quickly as possible. Thus, an effective system performing this type of similarity matrix computation would be difficult and expensive to implement. What is needed is a scalable approach for detecting network traffic exhibiting similarities associated with specific behaviors, such as suspicious DNS behavior, and that can quickly perform similarity computation on a large amount of data with reduced processing requirements.

SUMMARY OF THE DISCLOSURE

In accordance with the present disclosure, there is provided a computer-implemented method for detecting similar network activity, the method being carried out by a computer system having at least one processor, the method comprises receiving records comprising groups of Internet Protocol (IP) addresses and a plurality of domains, a first group of the groups of IP addresses being associated with a first domain of the plurality of domains; and applying, by the at least one processor, a first hash function to compute a first plurality of hash values for the first group, the first plurality of hash values including hash values for IP addresses in the first group. The method also comprises selecting a first hash value of the first plurality of hash values to determine a hash signature; outputting the hash signature and the first domain as a first pair; and grouping the first pair with a second pair, the second pair comprising a second hash signature having a same value as the first hash signature and a second domain. The method further comprises outputting the first domain and the second domain as a set of domains for use as candidates in a similarity computation.

Also in accordance with the present disclosure, there is provided a computer system for detecting similar network activity, the computer system comprising a memory storing instructions and a processor that, upon executing the stored instructions, is configured to receive records comprising groups of Internet Protocol (IP) addresses and a plurality of domains, a first group of the groups of IP addresses being associated with a first domain of the plurality of domains. The processor is further configured to apply a first hash function to compute a first plurality of hash values for the first group, the first plurality of hash values including hash values for IP addresses in the first group; and select a first hash value of the first plurality of hash values to determine a hash signature. The processor is further configured to output the hash signature and the first domain as a first pair; group the first pair with a second pair, the second pair comprising a second hash signature having a same value as the first hash signature and a second domain; and output the first domain and the second domain as a set of domains for use as candidates in a similarity computation.

Further in accordance with the present disclosure, there is provided a non-transitory computer-readable medium containing instructions that, when executed by a processor, cause the processor to perform a method. The method comprises receiving records comprising groups of Internet Protocol (IP) addresses and a plurality of domains, a first group of the groups of IP addresses being associated with a first domain of the plurality of domains; and applying a first hash function to compute a first plurality of hash values for the first group, the first plurality of hash values including hash values for IP addresses in the first group; selecting a first hash value of the first plurality of hash values to determine a hash signature. The method comprises the hash signature and the first domain as a first pair; grouping the first pair with a second pair, the second pair comprising a second hash signature having a same value as the first hash signature and a second domain; and outputting the first domain and the second domain as a set of domains for use as candidates in a similarity computation.

Before explaining at least one embodiment of the disclosure in detail, it is to be understood that the disclosure is not limited in its application to the details of construction and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

The accompanying drawings, which are incorporated and constitute part of the specification, illustrate certain embodiments of the disclosure, and together with the description, serve to explain the principles of the disclosure.

As such, those skilled in the art will appreciate that the conception upon which this disclosure is based may readily be utilized as a basis for designing other structures, methods, and/or systems for carrying out the several purposes of the present disclosure. It is important, therefore, to recognize that the claims should be regarded as including such equivalent constructions insofar as they do not depart from the spirit and scope of the present disclosure.

DETAILED DESCRIPTION

Reference will now be made in detail to the present embodiments of the disclosure, certain examples of which are illustrated in the accompanying drawings.

Figure 1:
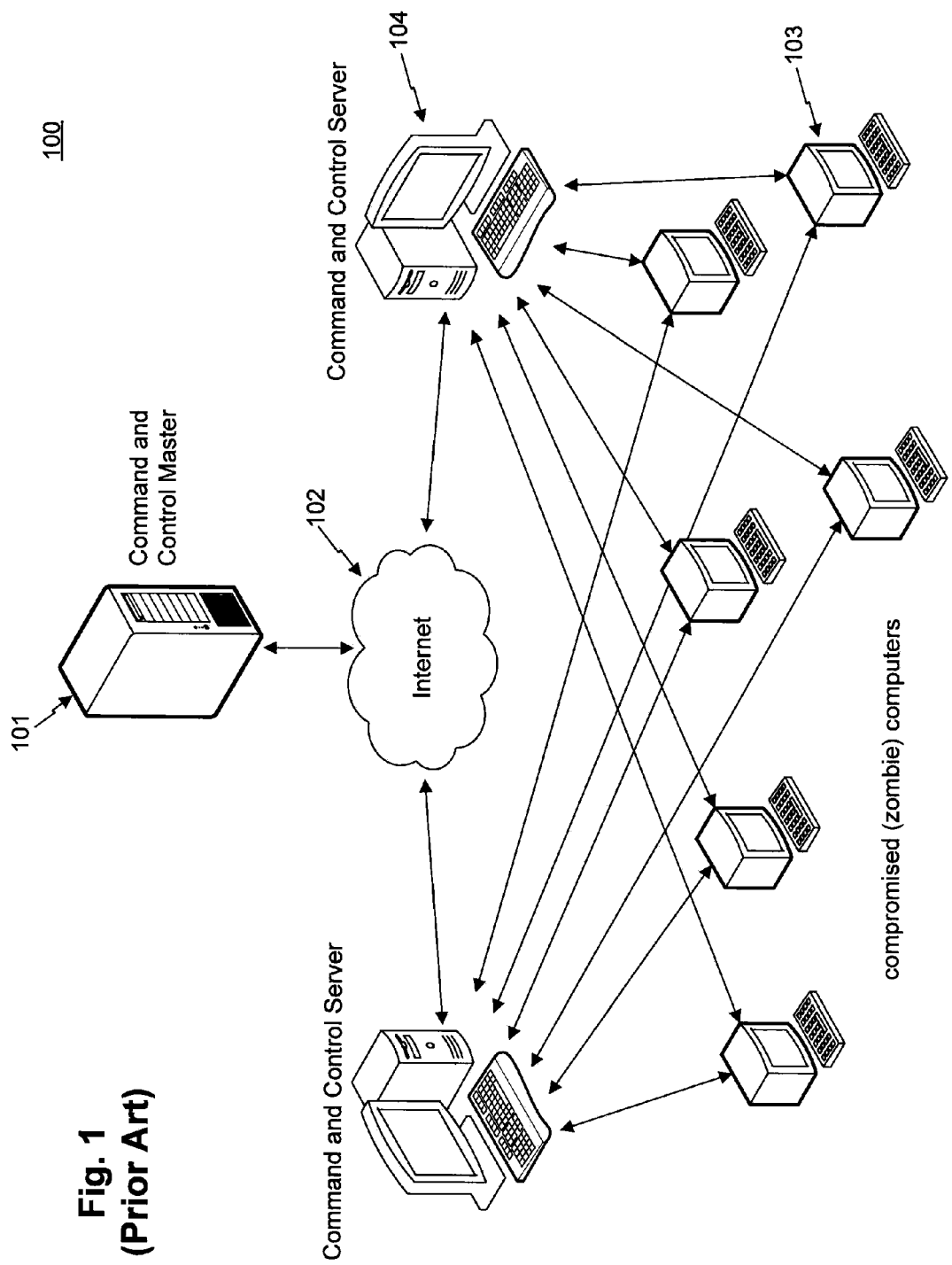
FIG. 1 illustrates a C&C network architecture of a botnet.
Figure 2:
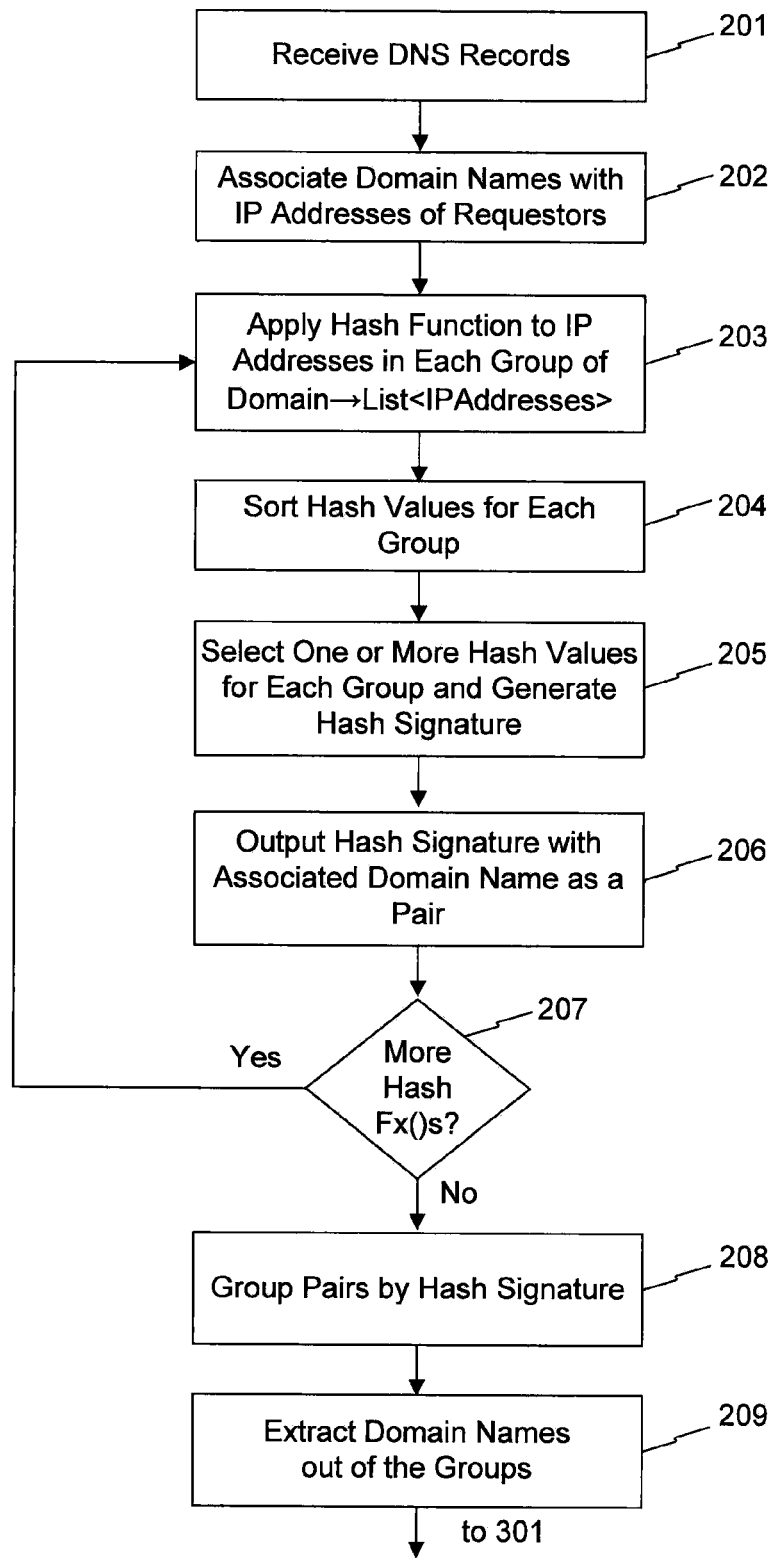
FIG. 2 illustrates an exemplary method for grouping domain names and extracting domain names out of the groups.

FIG. 2 illustrates a flow diagram of an exemplary method 200 for carrying out the embodiments disclosed herein. While method 200 is described as being performed to detect similar DNS traffic, the method may be used to detect other network traffic similarities. In step 201, records, such as DNS records, may be received. The records may contain query records from a period of time that include pairings of IP addresses and domain names, and each pairing may include an IP address of a network computer and a domain name requested by the network computer. In one embodiment, the records may include DNS request data, such as NXDomain or YXDomain data. The data may include pairings of IP addresses and domain names requested by network computers.

In step 202, the pairings may be associated by domain name so that each domain name of the DNS records may have an associated group of one or more IP addresses of one or more network computers that requested the particular domain name over the period of time. For example, if the pairings indicate that IP addresses 1.1.1.1, 2.2.2.2, 3.3.3.3, and 4.4.4.4 each requested domain name XYZ.com, an association may indicate that each IP address in the group of IP addresses [1.1.1.1, 2.2.2.2, 3.3.3.3, 4.4.4.4] requested domain name XYZ.COM.

In step 203, a hash function may be applied to IP addresses in each group of IP addresses to compute hash values for the IP addresses. For example, applying a hash function to the group in the above example may result in a value of 37 for IP address 1.1.1.1, a value of 29 for IP address 2.2.2.2, a value of 2 for IP address 3.3.3.3, and a value of 92 for IP address 4.4.4.4. In one embodiment, the first hash function may be applied to each IP address in each group of IP addresses, although the disclosure is not so limited. In step 204, the hash values may be sorted. For example, the hash values for each group may be sorted in order of increasing value. In the above example, this may result in a group of values 2, 29, 37, 92. In step 205, one or more hash values are selected from the sorted group of hash values to determine a hash signature. If only one hash value is selected, the hash signature may be the hash value itself. If more than one hash value is selected, the selected hash values may be combined to create a new hash value as the hash signature. In one embodiment, the selected hash value may be a minimum hash value of the group of values. If more than one hash value is selected, the selected number of hash values N may be the minimum N hash values of the group. In one embodiment, if more than one hash value is selected, combining the hash values may include summing the hash values. In step 206, the hash signature may be output with the group's associated domain as a pair. For example, selecting only the minimum hash value and domain in the above example may result in the pair <2, XYZ.COM>.

In step 207, it may be determined whether there are more hash functions to apply. A variety of different hash functions may be applied to the IP addresses in each group of IP addresses until the number of hash functions applied is equal to a total number of hash functions to apply. Any number of hash functions may be applied. In one embodiment, the total number of hash functions to apply may be set to a predetermined value. If it is determined that more hash functions need to be applied, then steps 203-206 may be repeated. This may be continued until there are no more hash functions to be applied. If there are no more hash functions to be applied, the method may proceed to step 208.

In step 208, the pairs may be grouped by hash signature. For example, if the pairings included <2, XYZ.COM>, <938, ABC.COM>, <2, MNO.COM>, and <63, SOY.COM>, the group may be [<2, XYZ.COM>, <2, MNO.COM>], because the domains XYZ.COM and MNO.COM have hash signatures of the same value. In step 209, domain names may be extracted out of the groups and used in a similarity matrix computation. Because only the grouped domain names may be used in the similarity matrix computation, the amount of data to be processed in the similarity matrix is reduced, allowing the computation to be performed more quickly.

Although the above method is described with respect to identifying domain names to use in a similarity matrix, the disclosure is not so limited. The above method may be used for detecting other network traffic similarities. For example, rather than pairing domain names with the IP addresses of requesting network computers, destination IP addresses of servers could be paired with IP addresses of network computers requesting the destination IP addresses. The steps of method 200 may then be applied to group the destination IP addresses and extract the grouped destination IP addresses for use in a similarity calculation to identify destination IP addresses that may belong to C&C servers.

Figure 3:
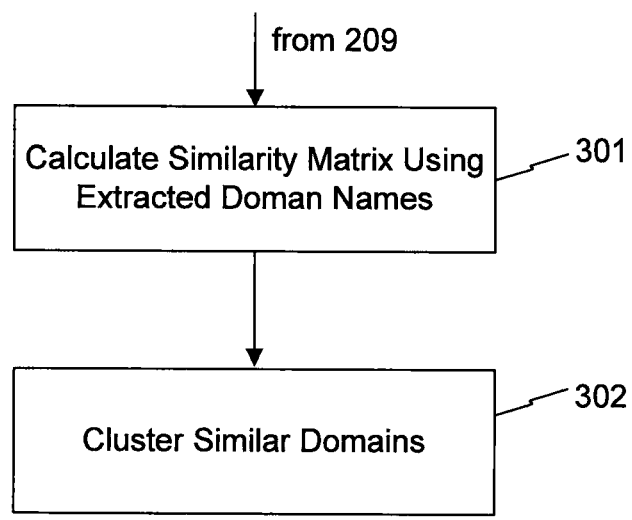
FIG. 3 illustrates an exemplary method for clustering domain names based on a similarity of network traffic associated with the domain names.
Figures 4, 5:
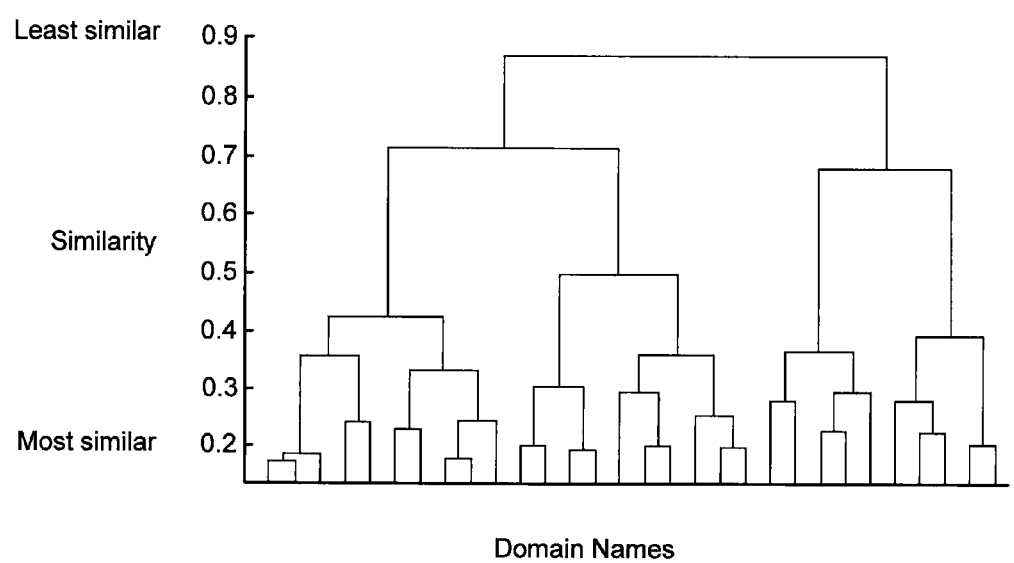
FIG. 4 illustrates an exemplary similarity matrix for use in determining similarity of DNS traffic among domain names.
FIG. 5 illustrates an exemplary dendrogram for use in clustering domain names based on the similarity of DNS traffic associated with the domain names.

FIG. 3 illustrates a flow diagram of a method 300 that may be performed after the domain names or destination IP addresses have been extracted from the groups. In step 301, a similarity matrix may be calculated using the extracted domain names or destination IP addresses. To calculate the similarity matrix, the group of IP addresses associated with each requested domain name or destination IP address may be compared with each group of IP addresses associated with every other requested domain name or destination IP address. For example, a domain name XYZ.COM may have an associated group of IP addresses [1.1.1.1, 2.2.2.2, 3.3.3.3, 4.4.4.4] that requested domain name XYZ.COM, and a domain name ABC.COM may have an associated group of IP addresses [1.1.1.1, 5.5.5.5, 6.6.6.6] that requested domain name ABC.COM. In calculating the similarity matrix, a similarity score may be calculated based on the similarity between the group of IP addresses associated with XYZ.COM and the group of IP addresses associated with ABC.COM. This calculation may be repeated to compute a similarity score between every possible pair of domain names or destination IP addresses. An exemplary similarity matrix is illustrated in FIG. 4.

Various known algorithms for calculating the similarity scores in the similarity matrix may be used. For example, the method may use a Jaccard or Cosine similarity calculation to calculate a similarity score for domain name or destination IP address comparisons. In step 302, once the similarity matrix has been calculated, a clustering algorithm may be used to cluster similar domains. For example, domain name XYZ.COM may be similar to domain name ABC.COM, and domain name ABC.COM may be similar to domain name MNO.COM. In this example, the clustering algorithm may be used to group the three domains of this example into one cluster. In one embodiment, agglomerative hierarchical clustering may be used to cluster similar domains.

The clustering algorithm may cluster domain names or destination IP addresses in order of similarity. For example, if the similarity score of the pair <XYZ.COM, ABC.COM> is the highest, a cluster may be created from this pair and the similarity matrix may be updated to group these two domains into this cluster. New similarity scores may then be calculated between the cluster and the other domain names, and the pair with the new highest similarity score may be selected to create a new cluster. These steps may be repeated until the similarity scores fall below a pre-set threshold value of similarity, for example, 95% similarity.

In one embodiment, the clustering algorithm may generate a dendrogram. A dendrogram is a tree diagram that may be used to illustrate the arrangement of clusters produced by hierarchical clustering. An exemplary dendrogram is illustrated in FIG. 5. The dendrogram may display clusters of domain names or destination IP addresses that exhibit the exact same or very similar traffic patterns.

In an exemplary embodiment, the methods of FIG. 2 and FIG. 3 may be periodically performed, such as once every hour. The domain names or destination IP addresses may then be assigned suspiciousness scores based on how consistently they appear in these time samples.

Data feeds from other sources may be integrated to enhance the accuracy of the suspiciousness scores. For example, data from a botnet watch list may be integrated to include information about botnets already known to exist. As botnets often change domain names, data relating to domains that are due to expire from a domain management system may be integrated to enhance the accuracy of the suspiciousness scores. Data may also be integrated from existing malware detection services, such as services listing domains suspected of being associated with malware, services listing domains or IP addresses that have been involved in DDoS attacks, publicly available security alerts, or other network security alerts. Data from a domain registration system listing historical registration information could also be integrated. For example, Whowas is a service that lists domain name registration histories. A suspicious domain name could be identified, for example, if the domain name is not registered in Whowas service and a large amount of traffic is detected over the domain name. Data regarding domains that were recently registered or name server IP addresses that were recently modified may also be integrated.

Figure 6:
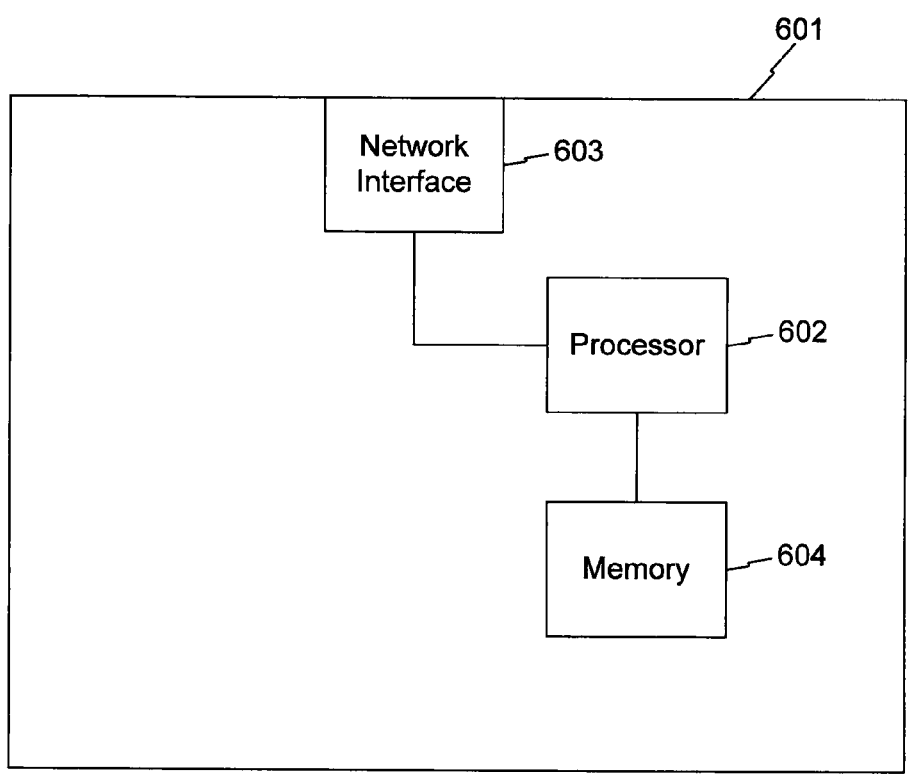
FIG. 6 illustrates an exemplary computer system for implementing the disclosed embodiments.

FIG. 6 is a diagram illustrating an exemplary computer system 600 that may be used for implementing the disclosed embodiments. Computer system 600 may include one or more computers 601, which may be servers, personal computers, and/or other types of computing devices. Computer 601 includes a processor 602 that may be any suitable type of processor. Processor 602 may be coupled to a network interface 603 for receiving and/or transmitting data and commands to/from other devices over wired networks, such as Universal Serial Bus (USB), Ethernet, Internet, FireWire, twisted-pair, coaxial cable, fiber optic, or other wired networks. Processor 602 may alternatively transmit/receive commands wirelessly over cellular, satellite, IEEE 802.11, terrestrial, or other wireless networks. Processor 602 may also be coupled to a computer providing a user interface for allowing input of information and commands to the processor and/or allowing output of information and commands in a human-readable form.

Processor 602 may also be coupled to a memory 604. Memory 604 may be configured to store instructions that, when executed by processor 602, carry out the exemplary steps of the disclosed embodiments. Memory 604 may also store an operating system, applications, and/or parameters. Data stored on memory 604 may be stored in a single dedicated memory, or a plurality of memory devices. Memory 604 may be any type of physical, non-transient memory, volatile or non-volatile, including, but not limited to, random access memory (RAM), read-only memory (ROM), magnetic storage, semiconductor storage, optical disc storage, and/or magneto-optical disc storage.

Figure 7:
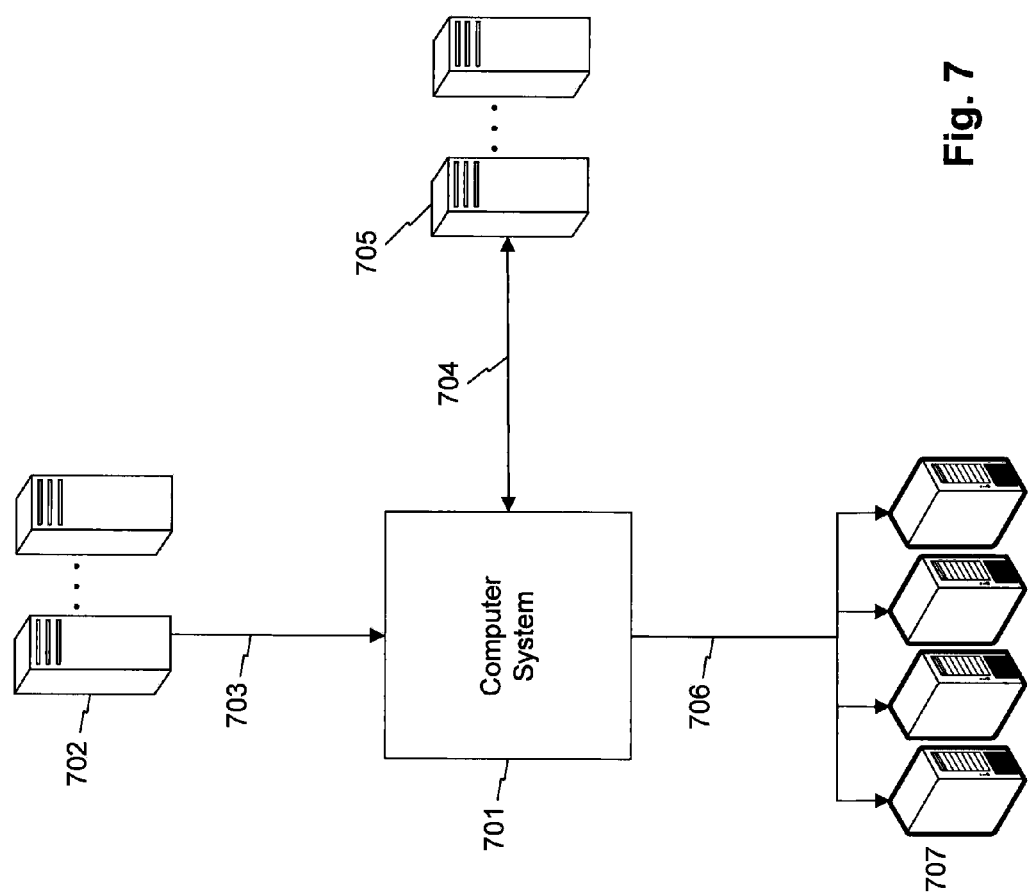
FIG. 7 illustrates an exemplary system for delivering a service using the disclosed embodiments.

FIG. 7 illustrates a diagram of an exemplary system 700 for delivering services based on detected similarities in network traffic. For example, a malware detection service may be provided using the disclosed embodiments. A computer system 701 may receive DNS records from one or more remote computers 702. In one embodiment, these records may be received over a communication link 703, such as a network. Remote computers 702 may include name servers, personal computers, or any other type of computing device. In one embodiment, remote computers 702 may include one or more TLD name servers. One or more computers of computer system 701 may carry out method 200 and method 300 using received DNS records. Alternatively, different computers of computer system 701 may carry out different portions of methods 200 and 300 (FIGS. 2 and 3). For example, method 200 may be carried out by a first computer and method 300 may be carried out by a second computer. In one embodiment, step 202 may be performed by one of remote computers 702 before computer system 701 retrieves the DNS records.

In one embodiment, a first computer of computer system 701 may compute the clusters using a clustering algorithm, such as agglomerative hierarchical clustering, and transmit the clusters to a second computer of computer system 701. The second computer may then calculate suspiciousness scores of domain names or IP addresses based on the clusters. In one embodiment, the second computer may additionally receive data feeds from one or more other sources 705 over a second communication link 704. Sources 705 may be one or more remote computers. In one embodiment, sources 705 may include one or more computers providing malware detection information. This information may include, for example, data from botnet watch lists, data from services relating to domains that are due to expire from a domain management system, data regarding known malware domains from existing services, data from a Whowas service, or data from services relating to domains that were recently registered. The second computer may integrate data from these data feeds into the calculation of the suspiciousness scores to increase the accuracy of the scores. Alternatively, the first computer may compute the clusters using the clustering algorithm and calculate the suspiciousness scores. Computer system 701 may additionally transmit cluster or suspiciousness data to other sources 705 over second communication link 704. Other sources 705 may use this data to enhance their own malware detection systems, for example.

In one embodiment, computer system 701 may transmit suspiciousness data to external secure web gateways or customers 707 for use in assigning scores to domain names or IP addresses. In one embodiment, this data may be transmitted over a communication link 706, such as a network. Alternatively, this information could be delivered on a non-transient computer-readable medium. These scores may then be used by external secure web gateways or customers 707 to determine whether or not traffic to/from a particular domain name or IP address should be blocked.

Communication links 703, 704, and 706 may be USB, Ethernet, Internet, FireWire, twisted-pair, coaxial cable, fiber optic, cellular, satellite, IEEE 802.11, terrestrial, and/Or other network connections, or any combination of these network connections. Communication links 703, 704, and 706 may be separate communication links, or one or more of them may be the same communication link.

Those skilled in the art will appreciate that the embodiments of the present disclosure, as described above, could be used in a variety of applications. Although described as being implemented on DNS records received at the TLD level, those skilled in the art would recognize that the embodiments of the present disclosure could be implemented at many different levels of the DNS hierarchy to detect suspicious DNS traffic. Alternatively, embodiments of the present disclosure may be used to detect other similarities in network traffic.

The many features and advantages of the disclosure are apparent from the detailed specification, and thus, it is intended by the appended claims to cover all such features and advantages of the disclosure which fall within the true spirit and scope of the disclosure. As used herein, the indefinite articles "a" and "an" mean "one or more" in open-ended claims containing the transitional phrase "comprising,"

"including," and/or "having." Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

The invention claimed is:

1. A computer-implemented method for detecting similar network activity, the method being carried out by a computer system having at least one processor, the method comprising:
   receiving records comprising groups of Internet Protocol (IP) addresses and a plurality of domains, a first group of the groups of IP addresses being associated with a first domain of the plurality of domains;
   applying, by the at least one processor, a first hash function to compute a first plurality of hash values for the first group, the first plurality of hash values including hash values for IP addresses in the first group;
   selecting a first hash value of the first plurality of hash values to determine a hash signature, wherein the hash signature represents the first group;
   outputting the hash signature and the first domain as a first pair;
   grouping the first pair with a second pair based on the second pair comprising a second hash signature having a same value as the first hash signature, wherein the second pair comprises a second domain; and
   outputting the first domain and the second domain as a set of domains for use as candidates in a similarity computation.

2. The method of claim 1, comprising performing a similarity computation including:
   calculating a similarity matrix by comparing a similarity of a group of IP addresses associated with a candidate domain and groups of IP addresses associated with other candidate domains and generating scores based on the similarity.

3. The method of claim 2, wherein the similarity computation further includes generating a dendrogram to cluster the candidate domain names to provide domain name clusters based on the scores.

4. The method of claim 1, wherein the selecting further comprises selecting a first minimum hash value of the first plurality of hash values.

5. The method of claim 1, wherein the selecting further comprises selecting a second hash value of the first plurality of hash values and summing the first hash value and the second hash value to determine the hash signature.

6. The method of claim 3, comprising performing the clustering of domain names a plurality of times, and assigning suspiciousness scores to the domain names based on appearances of the domain names in the clusters over a period of time.

7. The method of claim 3, comprising assigning suspiciousness scores to domain names based on the domain name clusters and data from malware services.

8. A computer system for detecting similar network activity, the computer system comprising:
   a memory storing instructions; and
   a processor that, upon executing the stored instructions, is configured to:
      receive records comprising groups of Internet Protocol (IP) addresses and a plurality of domains, a first group of the groups of IP addresses being associated with a first domain of the plurality of domains;
      apply a first hash function to compute a first plurality of hash values for the first group, the first plurality of hash values including hash values for IP addresses in the first group;
      select a first hash value of the first plurality of hash values to determine a hash signature, wherein the hash signature represents the first group;
      output the hash signature and the first domain as a first pair;
      group the first pair with a second pair based on the second pair comprising a second hash signature having a same value as the first hash signature, wherein the second pair comprises a second domain; and
      output the first domain and the second domain as a set of domains for use as candidates in a similarity computation.

9. The computer system of claim 8, wherein the processor is further configured to:
   calculate a similarity matrix by comparing a similarity of a group of IP addresses associated with each candidate domain with groups of IP addresses associated with other candidate domains and generating scores based on the similarity.

10. The computer system of claim 9, wherein the processor is further configured to:
    generate a dendrogram to cluster the candidate domain names to provide domain name clusters based on the scores.

11. The computer system of claim 8, wherein the processor is further configured to:
    select a first minimum hash value of the first plurality of hash values.

12. The computer system of claim 11, wherein the processor is further configured to:
    select a second hash value of the first plurality of hash values and sum the first hash value and the second hash value to determine the hash signature.

13. The computer system of claim 10, wherein the processor is further configured to:
    perform the clustering of the domain names a plurality of times, and assign suspiciousness scores to the domain names based on appearances of the domain names in the clusters over a period of time.

14. The computer system of claim 10, wherein the processor is further configured to:
    assign suspiciousness scores to domain names based on the domain name clusters and data from malware services.

15. A non-transitory computer-readable storage medium containing instructions that, when executed by a processor, cause the processor to perform a method comprising:
    receiving records comprising groups of Internet Protocol (IP) addresses and a plurality of domains, a first group of the groups of IP addresses being associated with a first domain of the plurality of domains;
    applying a first hash function to compute a first plurality of hash values for the first group, the first plurality of hash values including hash values for IP addresses in the first group;
    selecting a first hash value of the first plurality of hash values to determine a hash signature, wherein the hash signature represents the first group;
    outputting the hash signature and the first domain as a first pair;
    grouping the first pair with a second pair based on the second pair comprising a second hash signature having a same value as the first hash signature, wherein the second pair comprises a second domain; and outputting the first domain and the second domain as a set of domains for use as candidates in a similarity computation.

16. The computer-readable medium of claim 15, wherein the method further comprises calculating a similarity matrix by comparing the similarity of a group of IP addresses associated with each candidate domain with groups of IP addresses associated with other candidate domains and generating scores based on the similarity.

17. The computer-readable medium of claim 16, wherein the method further comprises generating a dendrogram to cluster the candidate domain names to provide domain name clusters based on the scores.

18. The computer-readable medium of claim 15, wherein the method further comprises selecting a first minimum hash value of the first plurality of hash values.

19. The computer-readable medium of claim 18, wherein the method further comprises selecting a second hash value of the first plurality of hash values and summing the first hash value and the second hash value to determine the hash signature.

20. The computer-readable medium of claim 17, wherein the method further comprises performing the clustering of domain names a plurality of times and assigning suspiciousness scores to the domain names based on appearances of the domain names in the clusters over a period of time.

* * * * *